United States Patent [19]

Marsh

[11] 3,783,832
[45] Jan. 8, 1974

[54] AUTOMATIC EGG INCUBATOR

[76] Inventor: Albert F. Marsh, 14232 Brookhurst, Garden Grove, Calif.

[22] Filed: May 19, 1972

[21] Appl. No.: 254,891

[52] U.S. Cl. ................................ 119/37, 119/44
[51] Int. Cl. ............................................ A01k 41/06
[58] Field of Search .................... 119/37, 39, 40, 44

[56] References Cited
UNITED STATES PATENTS

| | | | |
|---|---|---|---|
| 3,396,703 | 8/1968 | Trussell | 119/37 X |
| 1,501,292 | 7/1924 | Smith | 119/44 |
| 3,584,605 | 6/1971 | Schwartz | 119/37 |
| 2,939,423 | 6/1960 | Luce | 119/37 |
| 2,764,959 | 10/1956 | Church | 119/37 |
| 3,669,075 | 6/1972 | Marsh | 119/44 |

Primary Examiner—Louis G. Mancene
Assistant Examiner—J. N. Eskovitz
Attorney—Fowler, Knobbe & Martens

[57] ABSTRACT

A rack supports the eggs in rows with a movable grid above the rack extending between the eggs. The grid is moved periodically by a motor to turn the eggs. A transparent dome-like cover extending over the eggs supports a fan and a heater, while a plate supported by the cover directs the air downwardly around the periphery of the rack and upwardly towards the centrally supported fan. A humidifier water supply fountain is supported on the cover with a tube extending into a water compartment formed in the base of the incubator. An adjusting screw extending between the fountain and the cover adjusts the position of the lower end of the tube and thereby controls the water level within the incubator. The cover is formed with a peripheral flange which rests upon the side walls of the incubator so that the cover can be inverted during storage and shipment.

20 Claims, 8 Drawing Figures

PATENTED JAN 8 1974 3,783,832

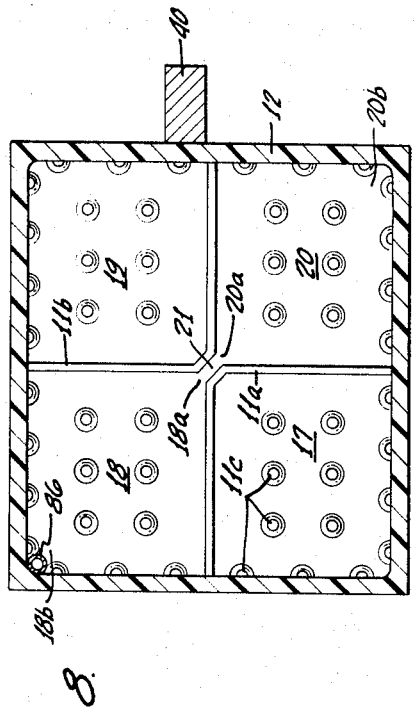
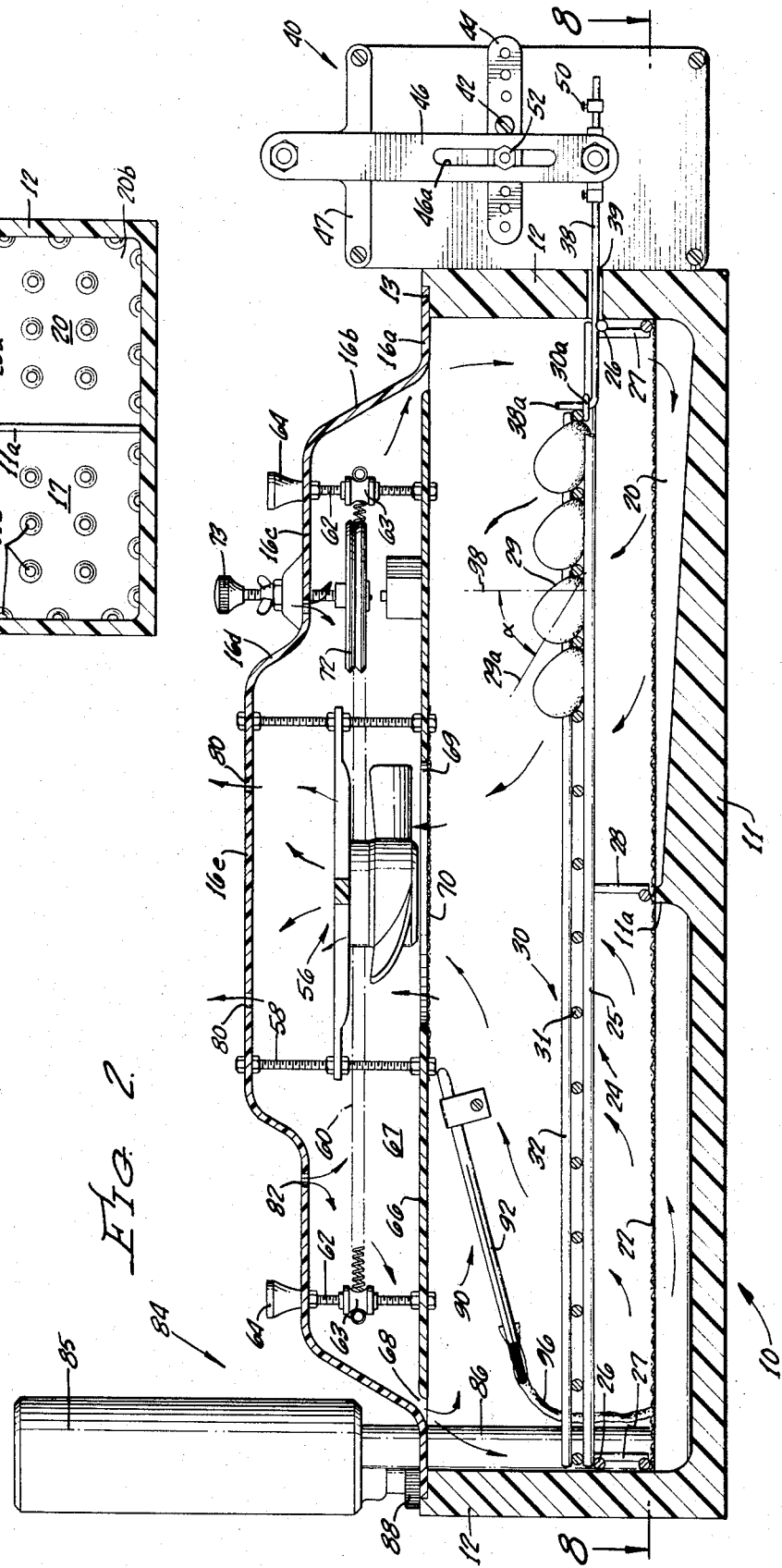

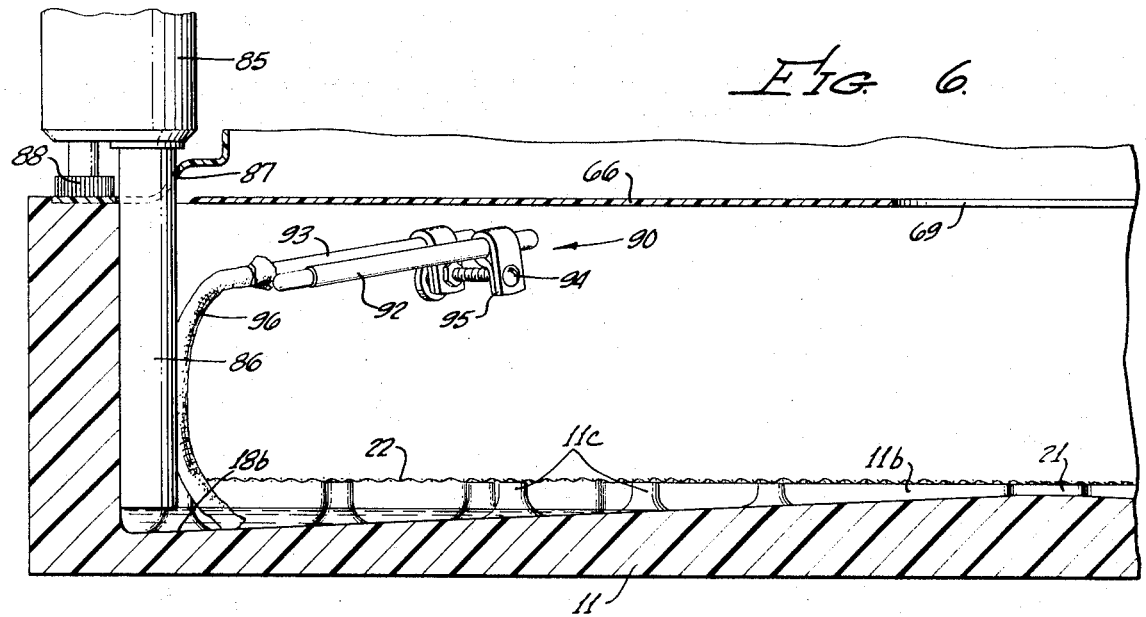
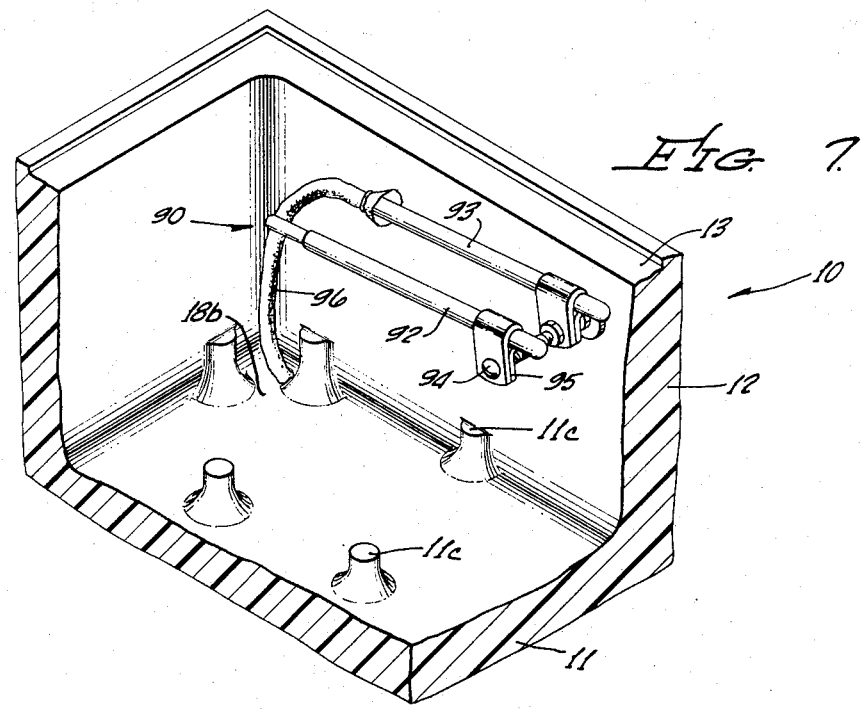

AUTOMATIC EGG INCUBATOR

This invention relates to an improved automatic egg incubator suited for home and hobby use as well as small commercial operations.

For the proper incubation of eggs it is desirable that the eggs be maintained at a uniform temperature of nearly 100°F. Variations of this, affect the hatching time and the percentage of eggs producing healthy chicks. It is also important that the air be fresh so that an adequate oxygen supply is available to be transmitted through the egg shell to the embryo.

Correct humidity is a further important consideration in obtaining a good hatch because it controls the degree of dehydration of the eggs. An egg normally develops a small air bubble in the large end which must be enlarged by the depletion of the fluids to a point where the embryo can easily reach its beak into the bubble and pick the cap of the shell off at hatching time. If humidity has consistently been too high, the bubble will not have decreased sufficiently and the embryo will not reach it, but will pip the shell below the air filled area. As a result, the embryo is likely to drown in the fluids. If humidity has been far too high, the baby chick will be oversized from excess fluids in its system and may not have room inside the shell to get its head out from under its wing where it developed, and therefor may never be able to make the effort to pick the shell. Conversely, if humidity has been too low, there will be overdrying of the fluids in the egg. The embryo will be retarded, especially near the end of its development. If it has strength to pick the shell at hatching time, the chick is likely to become stuck and not be able to turn over to continue pecking through the shell. Air entering the shell after the initial hole is made may further dry and stiffen the mucous causing the chick to become glued to the shell.

Turning of incubating eggs at regular intervals is necessary to prevent restrictions of the nerves and impairment of circulation of the growing embryo in the shell. Failure to do this may result in crippled chicks or embryos that cannot make the necessary maneuvers to peck out of the shell. Until the embryo is advanced in development it cannot turn itself. In the next, a mother bird normally moves the eggs with her beak at approximately 15 minute intervals. While turning of the eggs can be accomplished individually and manually, it is more convenient and reliable to have all of the eggs turned automatically and at one time.

Commercial incubators are available on the market which provide the foregoing features to varying degrees; however, they are in general relatively expensive and complex. Also they are typically fairly bulky structures that result in waste space due to the egg turning arrangement employed. Consequently, they are not practical for a small commercial operation or for home and hobby use. Hence, a need exists for a reliable, easy to use, automatic incubator providing the foregoing features for a relatively moderate cost. Additionally, it is very desirable that the unit be constructed compartly such that it can be conveniently stored and shipped by parcel post.

In accordance with this invention, an automatic incubator is disclosed herein that has the foregoing features and advantages. An egg supporting rack and grid arrangement is supported in the base of the incubator spaced from the bottom wall of the base. The rack and grid define a plurality of spaces each of which is adapted to receive an egg. The grid is movable in a plane generally parallel to the rack to pivot or turn each egg a limited amount. Preferably each egg is positioned with its small end in a space formed by the rack and grid, and the egg is moved so that its longitudinal axis is pivoted while its smaller end remains in the space. A motor for moving the grid at periodic intervals is mounted on the exterior of the base or the grid may be manually moved.

Air circulating and heating means are mounted on a cover or other movable door structure, which cooperates with other means enclosing the eggs. A plate mounted on the cover directs the heated air around the periphery of the cover towards and around the egg supporting rack and then back to the fan through a central opening in the plate. In a preferred arrangement the air circulating and heating means includes a fan centrally positioned on the lower side of the cover and a heating coil spaced from and surrounding the fan. The air directing plate extends beneath the fan and the heater. The cover includes a peripheral flange which engages the upper edge of the side walls of the base while the remainder of the cover has a flattened dome shape extending upwardly from the flange. This creates a space or compartment beneath the cover in which the heater is positioned. To provide compactness when the incubator is to be stored or shipped, the cover may be inverted so that the motor and fan portion extend downwardly into the base and the flat air directing plate forms the upper surface of the unit.

The incubator further includes an automatic air humidifying arrangement which includes a container or a compartment formed in the base beneath the egg supporting rack for containing a quantity of water. A water supply means is mounted on the exterior of the cover with a tube extending downwardly through the cover into the water container. The water supply means is vertically adjustable to control the position of the lower end of the tube with respect to the water in the container and thereby control the level of the water in the container. Hygrometer means are positioned in the incubator to indicate the humidity. Preferably the cover is formed of transparent material so that the hygrometer means can be read without lifting the cover. This also permits easy observation of the eggs.

Further features, objects and advantages of the invention will become more apparent by reference to the following detailed description and drawings in which:

FIG. 2 is a cross-sectional view of the incubator on line 2—2 of FIG. 1;

FIG. 6 is a cross-sectional view of the humidifying means of the incubator on line 6—6 of FIG. 1;

FIG. 7 is a cut-away, perspective view showing further detail of the humidifying means; and upwardly FIG. 8 is a cross-sectional view of the base on line 8—8 of FIG. 2.

Figure 1:
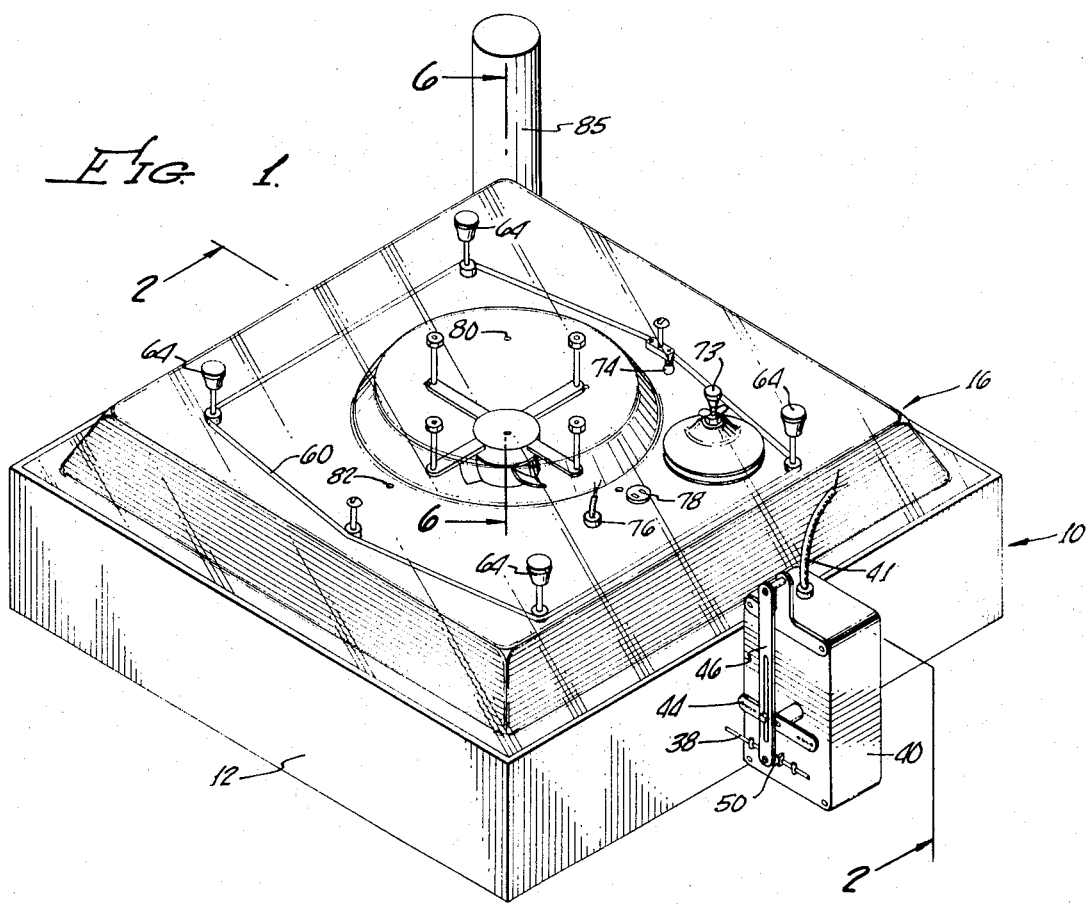
FIG. 1 is a perspective view of the overall incubator of the invention.

Referring now to FIGS. 1 and 2, the incubator may be seen to include a base 10 and a cover 16 or other movable structure which cooperates with the base to enclose the eggs to be incubated. The base, which is preferably made of plastic, has a rectangular shape and includes a bottom wall 11 with four upstanding side walls 12. The upper edges of the side walls 12 are formed with an inwardly opening recess 13 in which is received an outwardly extending peripheral flange 16a formed on the cover 16. The bottom wall 11 is formed with a pair of upwardly extending ribs 11a and 11b which generally divide the upper surface of the bottom wall into four quadrants 17, 18, 19 and 20, as best seen in FIG. 8. The opposing quadrants 18 and 20 form compartments or containers that have bottom walls which slope downwardly from their inner corners 18a and 20a near the center of the bottom wall 11, to low points at the opposite outer corners 18b and 20b. The inner corners 18a and 20a of these two compartments are joined by a channel 21 slightly below the upper surface of the ribs. In addition to the ribs 11a and 11b, there are provided a plurality of spaced short, upwardly extending posts 11c formed integral with the bottom wall 11.

Figure 5:
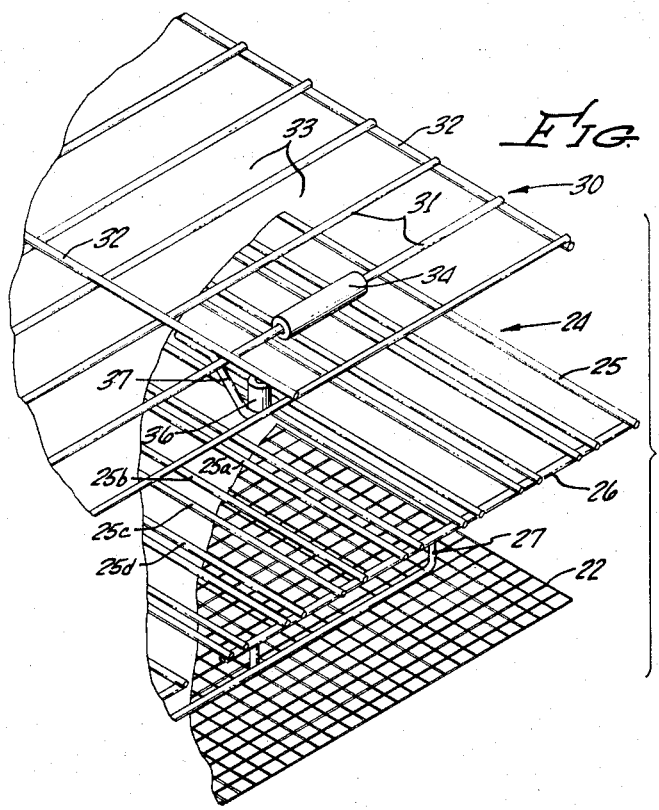
FIG. 5 is an exploded perspective view of one corner of the rack and grid construction.

Supported on the upper surfaces of the posts 11c and the ribs 11a and 11b is a screen 22 of wire hardware cloth, preferably having a mesh of approximately one-fourth inch. Referring to FIG. 5 as well as FIG. 2, positioned on the screen 22 is a rectangular rack 24 formed by a plurality of spaced parallel egg supporting rods or elements 25 joined at their ends by a pair of rod-like cross-pieces 26 extending generally parallel to each other and perpendicular to the egg supporting rods 25. The rods 25 are arranged in pairs, with the rods of each pair being spaced a distance slightly less than the shorter diameter of the eggs to be supported, so that a row of eggs 29 may be supported by each pair of rods. Thus, for example, rods 25a and 25b form a pair and the rods 25c and 25d form a second pair. The adjacent rods 25b and 25c of these two pairs of rods are spaced an amount sufficient to prevent interference between the eggs of adjacent rows and to permit adequate air circulation. As may be seen from FIG. 5, the end cross-pieces 26 have attached thereto a depending leg 27 which rests on the support screen 22 so that the egg supporting rods 25 are spaced upwardly from the screen. A similar leg structure 28 (FIG. 2) is attached to the mid-sections of the egg supporting rods 25 and engages the screen adjacent the ribs 11a and 11b.

Resting on the rack is a grid 30 formed by a series of rods or elements 31 which extend generally perpendicular to the egg supporting rods 25 of the rack 24 and are preferably spaced from each other a distance greater than the smaller diameter of the eggs 29 supported therein but less than the longer diameter or dimension of the eggs. The grid rods 31 are joined by a plurality spaced connecting elements 32 which extend parallel to the egg supporting rods of the rack. Together the rack rods 25 and grid rods 31 define a series of spaces 33 each of which can receive an egg 29. As seen from FIG. 5, a roller is mounted on one of the grid rods adjacent each corner of the grid. The rollers 34 engage the egg supporting rods 25 of the rack to facilitate movement of the grid in the plane of the grid in a direction parallel to the egg supporting rods 25 of the rack. A vertically oriented roller 36 is mounted on a support member 37 attached to one of the elements 32 connecting the grid rods 31. The roller 36 is positioned between the adjacent rods 25b and 25c of adjacent pairs of egg supporting rods to guide and facilitate movement of the grid 30 relative to the rack 24. One or more additional vertically oriented rollers 36 may be positioned at other suitable locations on the grid to assist further such movement.

A hook 38a formed on the end of a pull rod 38 extends through a loop 30a in the grid 30, and the pull rod 38 extends through a hole 39 in the side wall 12.

An automatic turner 40 is mounted on the exterior of the side wall and includes a motor and a speed reducing mechanism having an output shaft 42 with a rotating connecting arm 44 mounted thereon. A swing lever 46 is pivotally mounted at its upper end to a bracket 47 mounted on the drive means 40. The lower end of the swing lever 46 is connected to the pull rod 38 by suitable adjustable screw means 50. The central portion of the swing lever 46 is provided with an elongated slot 46a mounted on a pin 52 which is eccentrically supported on the rotating arm 44. Thus it can be seen that rotation of the motor shaft rotates the connecting arm 44 so that the pin 52 moves in a circular path causing the swing lever to be oscillated as its slot is guided on the pin. This in turn moves the lower end of the lever and the pull rod 38 in a generally reciprocating movement for moving the grid as desired. The turner 40 is further provided with a suitable timing means (not shown) which energizes the motor, rotating the arm 44 at desired intervals. For further details of a turner of this general type, refer to U.S. patent application entitled "Automatic Egg Turner for Incubator" Ser. No. 99,161, filed Dec. 17, 1970, now U. S. Pat. No. 3,669,075.

As can be seen from FIG. 2, the cover 16 has a generally flattened rectangular dome-shaped cross-section. Four sharply sloping side walls 16b extend upwardly from the flange 16a to a rectangular, horizontal area 16c. Centrally positioned in this area 16c is a circular section having upwardly sloping side walls 16d leading to a central generally horizontal upper section 16e.

Air treatment means is suspended from the cover including an electric fan 56 or other air circulating means attached to the central section 16e by a series of bolts 58. A heating coil 60 is suspended from the cover area 16c by a series of bolts 62 and insulators 63. Knobs 64 mounted on the upper ends of the bolts 62 not only attach the bolts 62 to the cover but are convenient for lifting the cover. Note that the coil 60 is spaced from and surrounds the fan 56.

Horizontally mounted on the lower end of the bolts 58 and 62 is an air directing plate 66 which forms a compartment 67 with the cover 16. The plate 66 is positioned approximately in the plane of the cover flange 16a and is shaped like the cover, but slightly smaller than the cover so that it is spaced from the flange a slight amount to define a peripheral air outlet 68 for the fan. Also a central opening 69 is formed in the plate to define an air inlet for the fan 56. A screen 70 extends across this opening to prevent access to the fan.

Also supported from the cover is a suitable thermostat 72 which may be easily adjusted by the knob 73. A pilot light 74 shown in FIG. 1 mounted on the cover adjacent the thermostat is energized when the heating coil 60 is energized. The fan motor 56, the heating coil 60, the thermostat 72 and the pilot light 74 are all connected in a single circuit having a power cord 76 extending outwardly through the cover and leading to a suitable source of power. Additionally an electrical socket 78 is conected to that circuit and mounted in the cover so that cord 41 from the automatic turner 40 may be plugged into this socket, and thus only the cord 76 to the power source is needed.

It is desirable that fresh air be continually introduced into the incubator and stale air be exhausted therefrom. For this purpose, there is provided a series of exhaust openings 80 formed in the central section 16e of the cover, and a series of fresh air intake openings 82 formed in the surrounding cover flattened area 16c.

Referring to FIGS. 2, 6 and 7, a humidity control means 84 includes a cylindrical reservoir or fountain 85 mounted on the cover adjacent one corner. The fountain includes a tube 86 connected to its lower end which extends downwardly through an opening 87 in the cover, through a corner notch formed in the grid 30, the rack 24 and the screen 22 so that the lower end of the tube is positioned in the water container or compartment 18 formed in the base 10. The end of the tube is spaced slightly from the bottom wall of the compartment so that water may flow from the fountain 85 into the compartment 18. An adjusting screw 88 is threaded into the bottom of the reservoir with the head of the screw engaging the cover flange 16a. Thus, by adjusting the screw 88 the lower end of the tube is adjusted with respect to the bottom of the compartment so that the quantity of water in the compartment 18 can be controlled.

Hygrometer means 90 is mounted within the base for measuring the humidity of the air within the incubator. This includes a dry bulb thermometer 92 and a wet bulb thermometer 93 mounted on brackets 95 attached to a bolt 94 or other fastener extending through the side of the base. A wick 96 is attached to the bulb end of the wet bulb thermometer 93 and the lower end of the wick extends into the water in the compartment.

One of the features of the invention is the manner in which it can be shipped and assembled. The incubator is normally shipped partly disassembled and in two separate parcels. One parcel contains the main base and the domed cover, and the other parcel holds the automatic turner, the water fountain and the hygrometer assembly. During shipment, the cover is inverted so that the fan and heater components are located within the base and the upper surface of the package is formed by the air directing plate 66. The upper side of the cover flange suitably mates with the upper edge of the base sides to support the cover.

OPERATION

When the unit is ready to be used the cover is removed and the automatic turner 40 is mounted to the exterior of the base with its drive link 38 extending through the side wall of the base connected to the grid 30, as shown in FIG. 2. In making this connection, the grid 30 is properly positioned with respect to the rack 24 so that the operational stroke of the drive rod will provide the desired movement of the eggs 29 on the grid and rack combination. The grid 30 is initially placed in one extreme position such as shown in FIG. 2 wherein its left edge is positioned adjacent the side or end wall opposite the turner 40.

The eggs 29 to be incubated are then placed in the spaces 33 defined by the rack and grid combination. Each egg should be similarly positioned with its smaller end down and with the egg longitudinal axis 29a positioned at an angle $\alpha$ of approximately 45° with respect to vertical 98, as shown in FIG. 2. As can be seen, the large end of each egg is supported by one of the grid rods 31 while the lower or smaller end of the egg is engaging an adjacent grid rod. The sides of the egg adjacent the lower, smaller end are of course engaging the rack rods 25.

Figure 3:
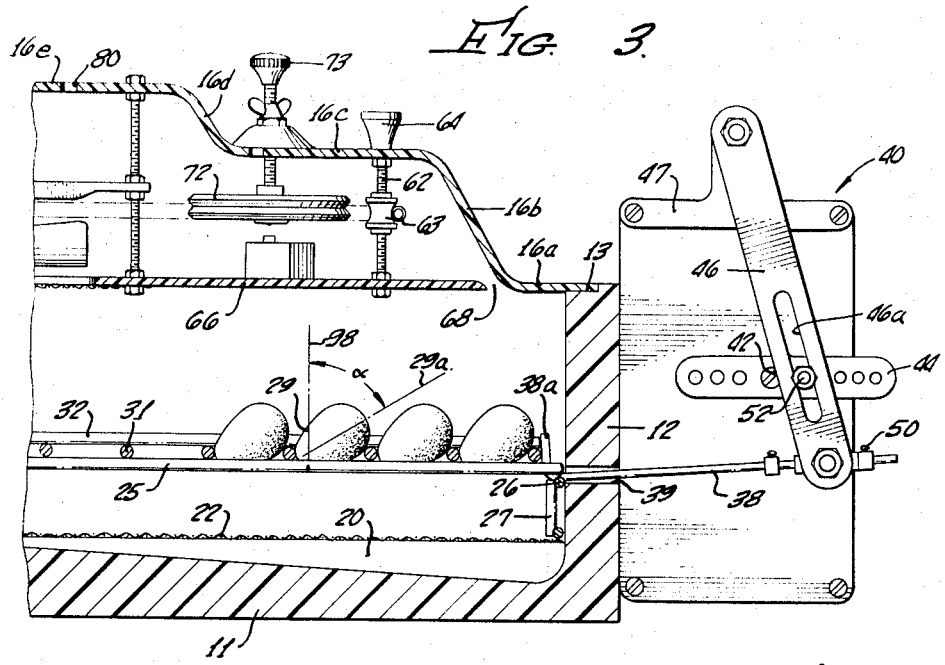
FIG. 3 is a cross-sectional view of a portion of the incubator as shown in FIG. 2 with the turning grid and the eggs moved from the position shown in FIG. 2.
Figure 4:
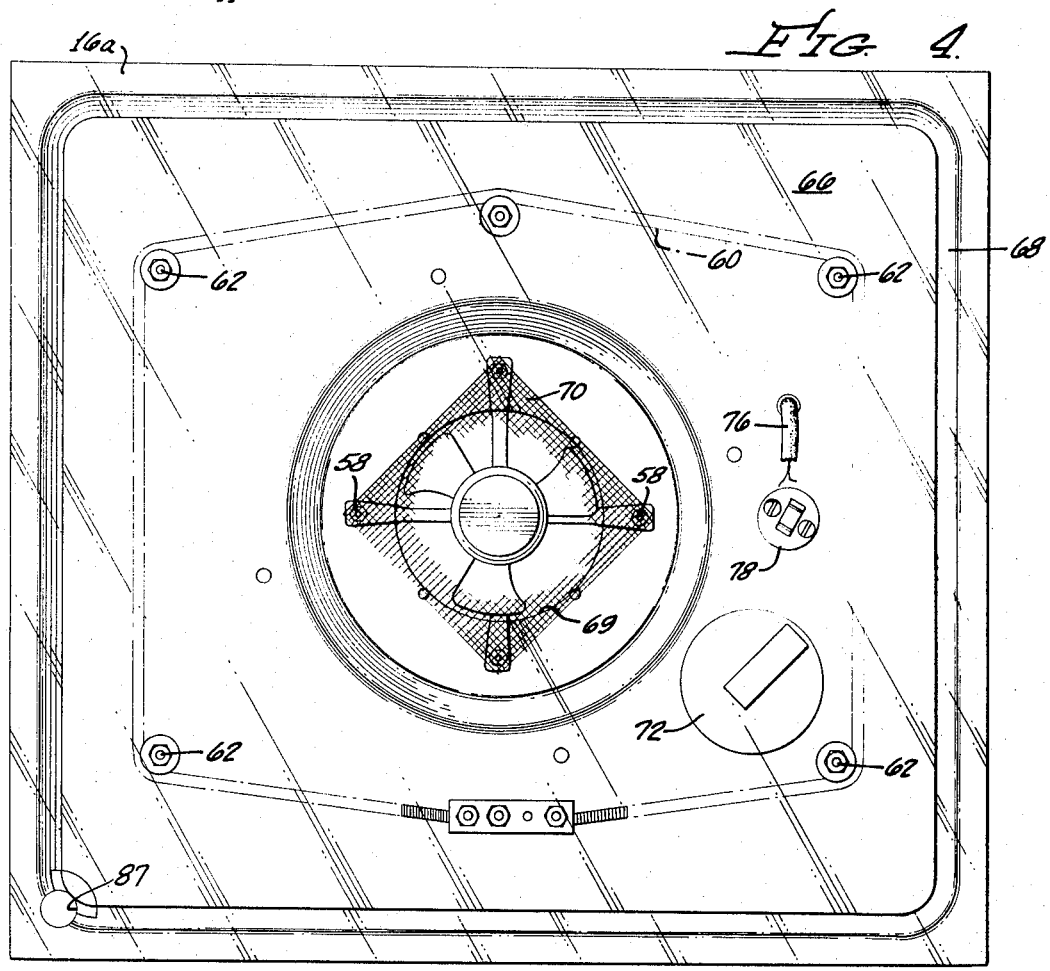
FIG. 4 is a bottom plan view of the cover assembly.

The timer in the automatic turner 40 can be set as desired, but preferably should be programmed to turn the eggs approximately once each hour. At that time, the timer motor will energize the drive motor within the turner 40 so as to move the grid into the position shown in FIG. 3. Note that this movement has pivoted or turned the eggs 29 so that the longitudinal axis 29a of each egg has been moved approximately 90° to the position as shown in FIG. 3. As can be seen by comparing the position of the swing lever in FIGS. 2 and 3, moving the grid from the position of FIG. 2 to that of FIG. 3 requires one-half revolution of the drive motor. The motor is deenergized at that point by the timer and, when it is once more energized the continued rotation will cause the drive rod to move the grid in the opposite direction.

Once the eggs have been properly positioned on the rack and grid, the hygrometer means 90 may be mounted on the base side wall 12 and the cover 16 may be placed on the base in the position shown in FIG. 2. The water fountain may be filled through its depending tube and the fountain inverted with the operator's finger placed over the lower end of the tube so that the water does not escape. The reservoir is then moved into position aligned with the opening in the cover; the operator's finger is removed from the lower end of the tube; and the tube is then quickly inserted through the hole in the cover and downwardly into the water compartment 18 in the base. As mentioned above the adjusting screw 88 limits the downward movement of the fountain and it may be conveniently adjusted as desired to determine the water level in the compartment.

With the water fountain properly positioned, the cord 41 from the automatic turner 40 is plugged into the socket 78, and the cord 76 is connected to a power source. This causes the timer in the automatic turner 40 and fan 56 to continuously operate, while the heater 60 will be periodically energized, as controlled by the thermostat 72. The fan output is directed upwardly and then dispersed outwardly by the cover, passed the heater coil 60, and then is directed downwardly by the cover through the peripheral outlet 68 formed by the cover 16 and the air directing plate 66, and downwardly into the base. The air is then deflected inwardly beneath and around the eggs toward the center of the incubator, where it is drawn upwardly by the fan through the central opening 69 in the air directing plate. Thus, with this arrangement, it can be seen that a continuous and uniform circulation of heated air occurs, providing the desired effect for the incubation of the eggs.

In drawing the air upwardly from the base, the fan creates an upward pressure on the central upper section of the cover. Thus, a limited, but continuous, quantity of air is exhausted from the incubator through the exhaust outlets 80. The balance of the fan output is directed outwardly over the heater to be recirculated. As the air is passing beneath the cover horizontal area 16c, it is moving in generally a horizontal direction across the air intake openings 82. This creates a venturi action across these openings 82 such that fresh air is drawn into the air stream from the exterior of the incubator.

The air being circulated through the base causes continual evaporation of the water in the compartment 18 formed in the base. The humidity in the air can be determined by taking readings on the wet and dry bulb thermometers and checking them against a suitable calibrated scale. Since the cover and the plate are made of clear transparent plastic, the temperature readings providing an indication of humidity can be observed without removing the cover. Also, this permits continuous inspection of the eggs. If the humidity is not at the desired level, it may be conveniently adjusted by turning the adjusting screw 88 and thereby determining the water surface area exposed in the incubator base. If an unusually large amount of water is required because of the low humidity of the incoming air the water can spill over from the compartment 18 into the compartment 20 by way of the channel 21.

With the proper initial adjustments of the incubator, it will continue to operate automatically to produce a uniform and high percentage hatch. One of the advantages of having an automatic system, in addition to eliminating the need for continued supervision, is that the eggs are more likely to hatch within a narrow time span. Turning should start when the eggs are set but should be discontinued one day before hatching of certain eggs such as 16 day eggs, and 2 days before hatching of 21 day eggs or eggs that take longer. Also, the turning grid should be removed before the eggs hatch to keep the chicks from crawling under it and getting caught or injured. To stop the turning, simply unplug the automatic turner cord 41 from the socket on the cover. Then remove the water fountain and the cover. The eggs can then be removed and the turning grid and the egg supporting rack removed. Following this, the eggs may be returned to the incubator and supported directly on the wire mesh or screen 22. Alternatively, the screen may also be removed, the rack and grid returned, and the screen placed on the grid. This has the advantage that the eggs are spaced further from the base, thus helping air circulation. Also, this eliminates storing the rack and grid elsewhere. When placing the eggs on the screen, care should be taken to see that the eggs are fairly evenly distributed and that none of the eggs have the small ends pointing upwardly. The eggs will naturally lay with the smaller end extending slightly downwardly. As mentioned above this increases the likelihood that the chick will properly escape from the egg. The incubator can then continue to be used for hatching the eggs. After the eggs have hatched, the chicks should be left in the incubator for about 24 hours which gives them a chance to dry and become active.

What is claimed is:
1. An automatic egg incubator comprising:
   means for enclosing a quantity of eggs including a base and a cover removably mounted thereon;
   rack and grid means supported in said base spaced from the bottom wall of the base, the rack and grid means defining a plurality of spaces each of which is adapted to receive a single egg, said grid means being movable in a plane generally parallel to the rack means to turn each egg about its longitudinal axis;
   means mounted exterior of the base for moving said grid at periodic intervals;
   air circulating and heating means mounted on said cover including means for directing the heated air downwardly around the periphery of the rack means and upwardly from the central portion of the rack means; and
   automatic air humidifying means comprising a container beneath the egg supporting rack for containing a quantity of water, adjustable water supply means mounted on the exterior of the incubator and having a tube extending downwardly into said container and humidity indicating means in said incubator.

2. In an automatic egg incubator, means for supporting and turning a plurality of eggs comprising:
   a rack having a series of pairs of spaced elongated elements, the elements of each pair being adapted to support a row of eggs, each pair of elements being spaced from the adjacent pair a distance greater than the distance between the elements of a pair of elements;
   a grid extending generally parallel to and in close proximity to the rack and having a series of spaced elongated elements crossing the rack elements, the spacing between the grid elements being such that a grid element extends closely adjacent each egg; and
   means for moving one of said rack and grid in a direction parallel to the elements of the other of said rack and grid.

3. The egg incubator of claim 2 wherein said rack elements are spaced sufficiently such that two elements adequately support a row of eggs, and a grid element is positioned between each egg in the row of eggs, and said grid is movable in a direction parallel to the rack elements to turn the eggs.

4. The incubator of claim 3 wherein said rack elements supporting the row of eggs are spaced from each other a distance slightly less than the shorter diameter of the eggs.

5. The incubator of claim 4 wherein said grid elements are spaced from each other a distance greater than said shorter diameter but less than the length of the eggs.

6. In an egg incubator having means for enclosing a quantity of eggs, means for maintaining desired humidity within the incubator comprising:
   a container for containing a quantity of water within the incubator with the water being open to the air within the incubator to be readily evaporated;
   a water fountain mounted on the exterior of the incubator and having a tube extending into the container;
   means for adjusting the height of the lower end of the tube while keeping it in the water so as to determine the level of water in the container by balancing the pressure on the water in the fountain with the pressure on the water in the container; and
   humidity indicating means positioned in the incubator.

7. The incubator of claim 6 wherein said humidity indicating means includes a wet bulb thermometer having a wick extending into the water in the incubator and a dry bulb thermometer for measuring the temperature within the incubator, whereby the temperature of the web bulb thermometer may be utilized to determine the humidity of the air within the incubator.

8. The incubator of claim 6 wherein the means enclosing the eggs includes a base having a part of its bottom wall forming said water container, the bottom wall forming the container being sloped so that its lowest portion is in the area where the wick is positioned.

9. The incubator of claim 6 wherein the means enclosing the eggs includes a base supporting the eggs and a cover thereon, means on said base supporting the humidity indicating means, and said cover being translucent to permit the thermometer to be read without lifting the cover.

10. The incubator of claim 6 wherein said means for enclosing the eggs includes a base and a cover, said fountain being supported on the cover with the tube extending through an opening in the cover into the water container.

11. The incubator of claim 10 wherein said means for adjusting the height of the lower end of the tube includes an adjusting screw extending between the fountain and said cover whereby the entire fountain and tube may be raised and lowered as desired.

12. The incubator of claim 6 including rack means spaced upwardly from the bottom wall of the enclosing means such that the water container is positioned beneath the rack means.

13. An egg incubator comprising:
means for enclosing a plurality of eggs including a movable structure for providing convenient access to the eggs;
air circulating means supported on said movable structure and located on the inner side of the structure;
air heating means supported by said structure and positioned radially outwardly from the air circulating means; and
a generally imperforate member spaced from and supported by said structure to define a space with the structure within which the air circulating means and heating means are positioned, said member having a central opening defining an air inlet to the air circulating means, and said member being spaced from the periphery of said structure to define with the structure a peripheral air outlet so that the air from the central portion of the interior of the enclosing means is drawn through said member opening to the air circulating means, passed the air heating means, and outwardly towards the periphery of the movable structure and towards the periphery of the egg enclosing means.

14. An egg incubator comprising:
a base with a bottom wall and upstanding side walls;
means within the base for supporting a plurality of eggs spaced from the bottom wall;
a cover having a peripheral portion which cooperates with the side walls to enclose the base, said cover having a central portion which extends upwardly from the peripheral portion thereby creating a space below the central portion but above the peripheral portion;
a generally imperforate plate suspended from the cover in the approximate plane of the cover peripheral portion, a series of elongated rigid fasteners supporting the plate from the cover so that the cover forms the bottom wall of the space, said plate being slightly spaced peripherally from the peripheral portion of the cover to define with the cover a peripheral air outlet from the cover space to the base, said plate having a central opening forming an air inlet from the base to the cover space;
a fan supported between the cover and the plate above the central opening in the plate to draw air from the central portion of the base and force it outwardly and then downwardly through said peripheral air outlet into the base adjacent the base side walls; and
heating means supported between the cover and the plate radially outwardly from the fan.

15. The incubator of claim 14 wherein the height of the cover is less than the height of said side walls and the peripheral portion of the cover and the side walls of the base are adapted to permit the cover to be inverted on the base for storage or shipment.

16. The incubator of claim 15 wherein said fan is supported by a first group of said fasteners and said heating means is supported by a second group of said fasteners.

17. The incubator of claim 14 including means in said cover defining an air exhaust to the exterior of the incubator, and means in the cover defining a fresh air intake.

18. The incubator of claim 17 wherein said exhaust means comprises one or more holes located generally above the fan and said fresh air intake means comprises one or more holes in the cover spaced outwardly from the fan, the cover being formed such that the air output from the fan moves across the fresh air intake such that fresh air is drawn in through the intake openings by venturi action.

19. The incubator of claim 18 wherein the portion of the cover directly above the fan is raised above the surrounding cover portion.

20. The incubator of claim 13 including air intake means on said movable structure for introducing exterior air into the enclosure; and
means on said movable structure for exhausting air to the exterior of the enclosure.

\* \* \* \* \*